United States Patent
Okada

(10) Patent No.: US 11,966,189 B2
(45) Date of Patent: Apr. 23, 2024

(54) GEAR, DRIVING DEVICE, AND IMAGE FORMING APPARATUS

(71) Applicant: FUJIFILM Business Innovation Corp., Tokyo (JP)

(72) Inventor: Kenta Okada, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/584,756

(22) Filed: Jan. 26, 2022

(65) Prior Publication Data
US 2023/0094009 A1  Mar. 30, 2023

(30) Foreign Application Priority Data

Sep. 27, 2021 (JP) .................................. 2021-156721

(51) Int. Cl.
*G03G 15/00* (2006.01)
*F16H 57/00* (2012.01)

(52) U.S. Cl.
CPC ........ *G03G 15/757* (2013.01); *F16H 57/0025* (2013.01)

(58) Field of Classification Search
CPC .............. F16H 57/0025; G03G 15/757; G03G 21/1857
See application file for complete search history.

(56) References Cited

U.S. PATENT DOCUMENTS

| 8,233,836 B2 * | 7/2012 | Morimoto ............ G03G 15/757 399/388 |
| 9,014,599 B2 * | 4/2015 | Ota ...................... G03G 21/186 399/263 |
| 9,046,163 B2 * | 6/2015 | Takagi ..................... F16H 55/06 |
| 9,581,953 B2 * | 2/2017 | Suido .................. F16H 57/0025 |
| 2008/0317509 A1 * | 12/2008 | Mori .................. G03G 21/1857 475/331 |
| 2009/0196655 A1 * | 8/2009 | Takigawa ........... G03G 21/1864 399/167 |
| 2017/0371297 A1 * | 12/2017 | Ikeda .................. G03G 15/0806 |
| 2018/0191226 A1 * | 7/2018 | Walter ................ F16H 57/0025 |

FOREIGN PATENT DOCUMENTS

| JP | 0616140 A2 * | 9/1994 | ............... F16D 1/08 |
| JP | H10-226439 A | 8/1998 | |
| JP | 3352328 B2 | 12/2002 | |
| JP | 2019-139162 A | 8/2019 | |

* cited by examiner

*Primary Examiner* — Bobby Rushing, Jr.
(74) *Attorney, Agent, or Firm* — Oliff PLC

(57) ABSTRACT

A gear includes a gear body to be attached to a distal end of a driving shaft in an axial direction of the driving shaft and including teeth each extending obliquely with respect to the axial direction, and a stopping portion included in the gear body and configured in such a manner as to allow the driving shaft to which the gear body is attached to move in a circumferential direction. When the driving shaft moves in the circumferential direction, the stopping portion is enabled to stop the gear body from moving in the axial direction, the stopping portion stopping the gear body by coming into contact with a portion of the driving shaft.

12 Claims, 14 Drawing Sheets

GEAR, DRIVING DEVICE, AND IMAGE FORMING APPARATUS

CROSS-REFERENCE TO RELATED APPLICATIONS

This application is based on and claims priority under 35 USC 119 from Japanese Patent Application No. 2021-156721 filed Sep. 27, 2021.

BACKGROUND

(i) Technical Field

The present disclosure relates to a gear, a driving device, and an image forming apparatus.

(ii) Related Art

There are several known technologies relating to a driving device intended for an image forming apparatus, including those disclosed by Japanese Unexamined Patent Application Publications No. 10-226439 and No. 2019-139162 and Japanese Patent No. 3352328.

According to Japanese Unexamined Patent Application Publication No. 10-226439, a driving-force-transmitting device is prevented from coming off a fixed shaft by including a snap-fitting portion to be fitted into a groove provided in the fixed shaft with a gap interposed between the snap-fitting portion and the fixed shaft, in which a thrust generated by the rotation of the driving-force-transmitting device acts to move the driving-force-transmitting device in a direction toward a contact member; and, with an end of the driving-force-transmitting device being in contact with the contact member, a gap is produced in the groove between the snap-fitting portion and the fixed shaft.

According to Japanese Unexamined Patent Application Publication No. 2019-139162, when a driving-force-outputting member drives a driving object, the driving-force-outputting member receives from the driving object a first force acting in a direction in which the driving-force-outputting member would come off a rotating shaft; and when the driving-force-outputting member is driven by a driving-force-transmitting member, the driving-force-outputting member receives from the driving-force-transmitting member a second force acting in a direction opposite to the direction of the first force and being greater than or equal to the first force.

According to Japanese Patent No. 3352328, a process cartridge includes the following: a driving-force-transmitting member extending from the outside to the inside of the developer container and that transmits a driving force received from an apparatus body to a stirring member through a helical gear, the stirring member being provided inside the developer container, the helical gear being provided outside the developer container; a locking member provided inside the developer container and that prevents coming off of the driving-force-transmitting member from the developer container by coming into contact with an inner wall of the developer container; a thrust receiving member provided on the developer container; and a contact portion included in the driving-force-transmitting member and that limits the position of the driving-force-transmitting member by coming into contact with the thrust receiving member when a thrust generated by the helical gear receiving the driving force moves the driving-force-transmitting member from the outside to the inside of the developer container such that the locking member moves away from the inner wall of the developer container, in which a distance K1 between the contact portion and the locking member is greater than a distance K2 between the thrust receiving member and the inner wall of the developer container (K1>K2).

SUMMARY

Aspects of non-limiting embodiments of the present disclosure relate to a configuration in which a force that suppresses a thrust acting on a rotating component is generated with no additional stopping member.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a gear that includes a gear body to be attached to a distal end of a driving shaft in an axial direction of the driving shaft and including teeth each extending obliquely with respect to the axial direction, and a stopping portion included in the gear body and configured in such a manner as to allow the driving shaft to which the gear body is attached to move in a circumferential direction, wherein when the driving shaft moves in the circumferential direction, the stopping portion is enabled to stop the gear body from moving in the axial direction, the stopping portion stopping the gear body by coming into contact with a portion of the driving shaft.

BRIEF DESCRIPTION OF THE DRAWINGS

An exemplary embodiment of the present disclosure will be described in detail based on the following figures, wherein.

DETAILED DESCRIPTION

Figure 1:
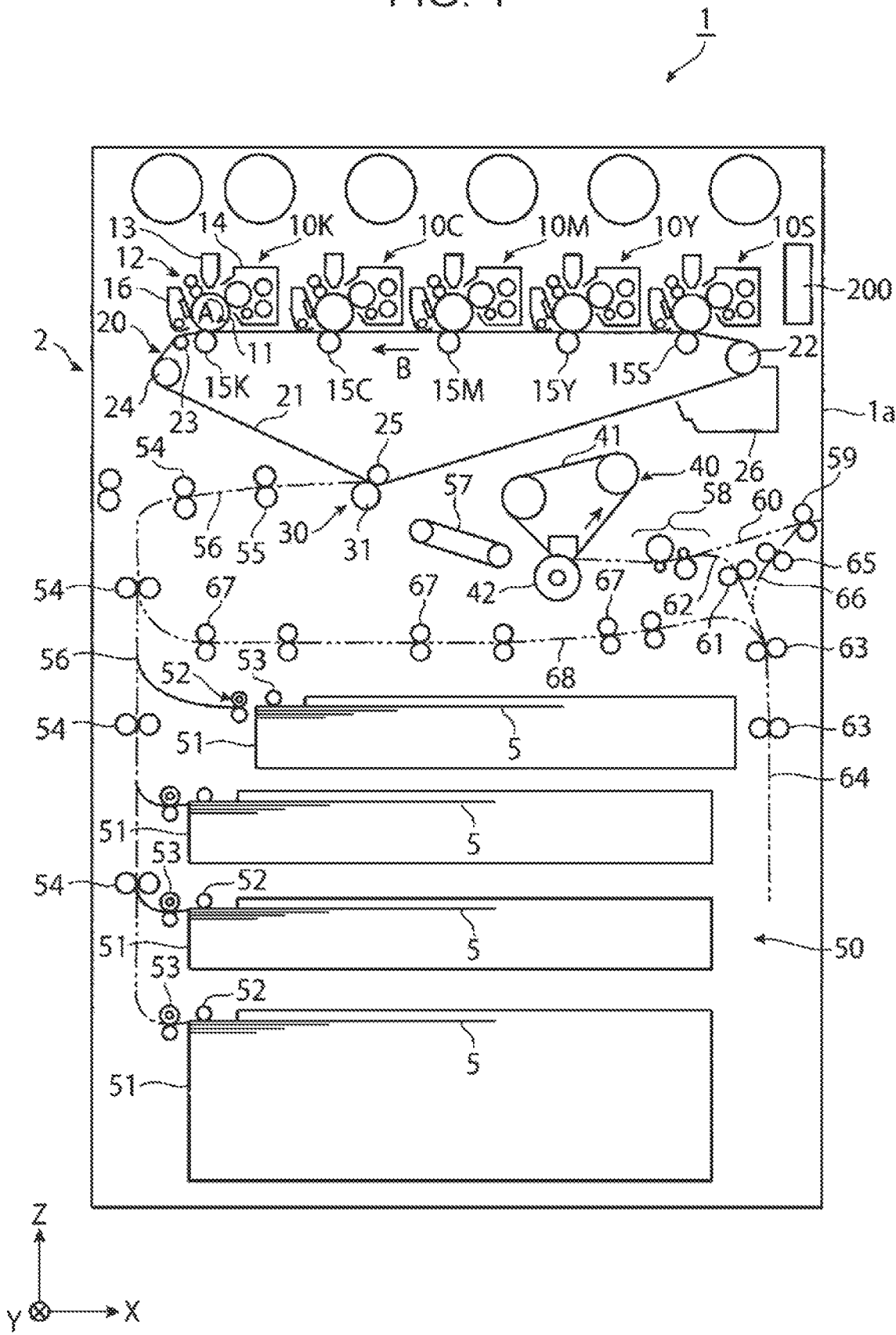
FIG. 1 illustrates an overall configuration of an image forming apparatus to which a driving device according to the exemplary embodiment of the present disclosure is applied.

FIG. 1 illustrates an image forming apparatus to which a gear and a driving device according to an exemplary embodiment is applied. In FIG. 1, the width direction of the image forming apparatus coincides with a horizontal direction and is defined as the X direction, the depth direction of the image forming apparatus coincides with another horizontal direction and is defined as the Y direction, and the height direction of the image forming apparatus coincides with the vertical direction and is defined as the Z direction.
Overall Configuration of Image Forming Apparatus The image forming apparatus, 1, according to the present exemplary embodiment is configured as, for example, a color printer. The image forming apparatus 1 includes an apparatus body 1a, having substantially the same X-direction size as a known full-color printer, and is capable of simultaneously forming a full-color image composed of four colors of yellow (Y), magenta (M), cyan (C), and black (K) and an image composed of any one of various specific colors: for example, an image in a metallic color such as gold (G) or silver (S); an image in a single color of red (R), green (G), blue (B), or the like; an image in a corporate color such as cosmic blue or horizon red for Mizuho Financial Group; or an image in a transparent or white color.

The image forming apparatus 1 includes the following: a plurality of imaging devices 10, which form toner images with toners contained in developers 4, respectively; an intermediate transfer device 20, which receives the toner images formed by the imaging devices 10 and transports the toner images to a second-transfer position, where the toner images are eventually second-transferred to a recording sheet 5 (an exemplary recording medium); a sheet feeding device 50, which stores predetermined recording sheets 5 to be supplied to the second-transfer position in the intermediate transfer device 20 and feeds the recording sheets 5 thereto one by one; and a fixing device 40, which fixes the toner images second-transferred to the recording sheet 5 from the intermediate transfer device 20. A combination of the plurality of imaging devices 10 and the intermediate transfer device 20 serves as an image forming section 2, in which an image is to be formed on a recording sheet 5. The apparatus body 1a of the image forming apparatus 1 is formed of supporting members, an exterior covering, and so forth. The two-dot chain lines in FIG. 1 represent transport paths along which the recording sheet 5 is transported in the apparatus body 1a.

As the imaging devices 10, the following are provided: four imaging devices 10Y, 10M, 10C, and 10K, which exclusively form toner images in four respective colors of yellow (Y), magenta (M), cyan (C), and black (K); and an imaging device 10S, which forms a toner image in the specific color (S). The five imaging devices 10 (S, Y, M, C, and K) are arranged side by side in the X direction in a space provided inside the apparatus body 1a. In the present exemplary embodiment illustrated in FIG. 1, the imaging device 10S for the specific color (S) is provided at the upstreammost position in the direction of rotation of an intermediate transfer belt 21, which is included in the intermediate transfer device 20, followed by the other imaging devices 10 (Y, M, C, and K) for yellow (Y), magenta (M), cyan (C), and black (K) in that order in the direction of rotation of the intermediate transfer belt 21. The position of the imaging device 10S for the specific color (S) is not limited to such a position and may be the downstreammost position in the direction of rotation of the intermediate transfer belt 21, or a position between any adjacent two of the other imaging devices 10 (Y, M, C, and K) for yellow (Y), magenta (M), cyan (C), and black (K).

The imaging devices 10 (S, Y, M, C, and K) have the same configuration but are different in the colors of images to be formed. The imaging devices 10 (S, Y, M, C, and K) each include a rotatable photoconductor drum 11 (S, Y, M, C, or K), which is an exemplary image carrier (image forming component). The photoconductor drum 11 is surrounded by elements including the following devices (exemplary image forming components): a charging device 12 (S, Y, M, C, or K), which charges an image-formable circumferential surface (an image carrying surface) of the photoconductor drum 11 to a predetermined potential; an exposure device 13 (S, Y, M, C, or K), which applies light generated from image information (a signal) to the charged circumferential surface of the photoconductor drum 11 and thus produces a potential difference to form an electrostatic latent image (for a corresponding one of the colors); a developing device 14 (S, Y, M, C, or K), which develops the electrostatic latent image into a toner image with the toner contained in the developer 4 and having a corresponding one of the colors (S, Y, M, C, and K); a first-transfer device 15 (S, Y, M, C, or K), which first-transfers the toner image to the intermediate transfer device 20; and a drum cleaning device 16 (S, Y, M, C, or K), which removes residual matter such as toner particles from the image carrying surface of the photoconductor drum 11 having undergone first transfer.

The photoconductor drum 11 is obtained by providing a photoconductive layer (photosensitive layer) serving as an image carrying surface and made of a photosensitive material over the circumferential surface of a cylindrical or columnar base member that is to be grounded. The photoconductor drum 11 is supported in such a manner as to rotate in a direction A when receiving power transmitted from a driving device (not illustrated).

Figure 2:
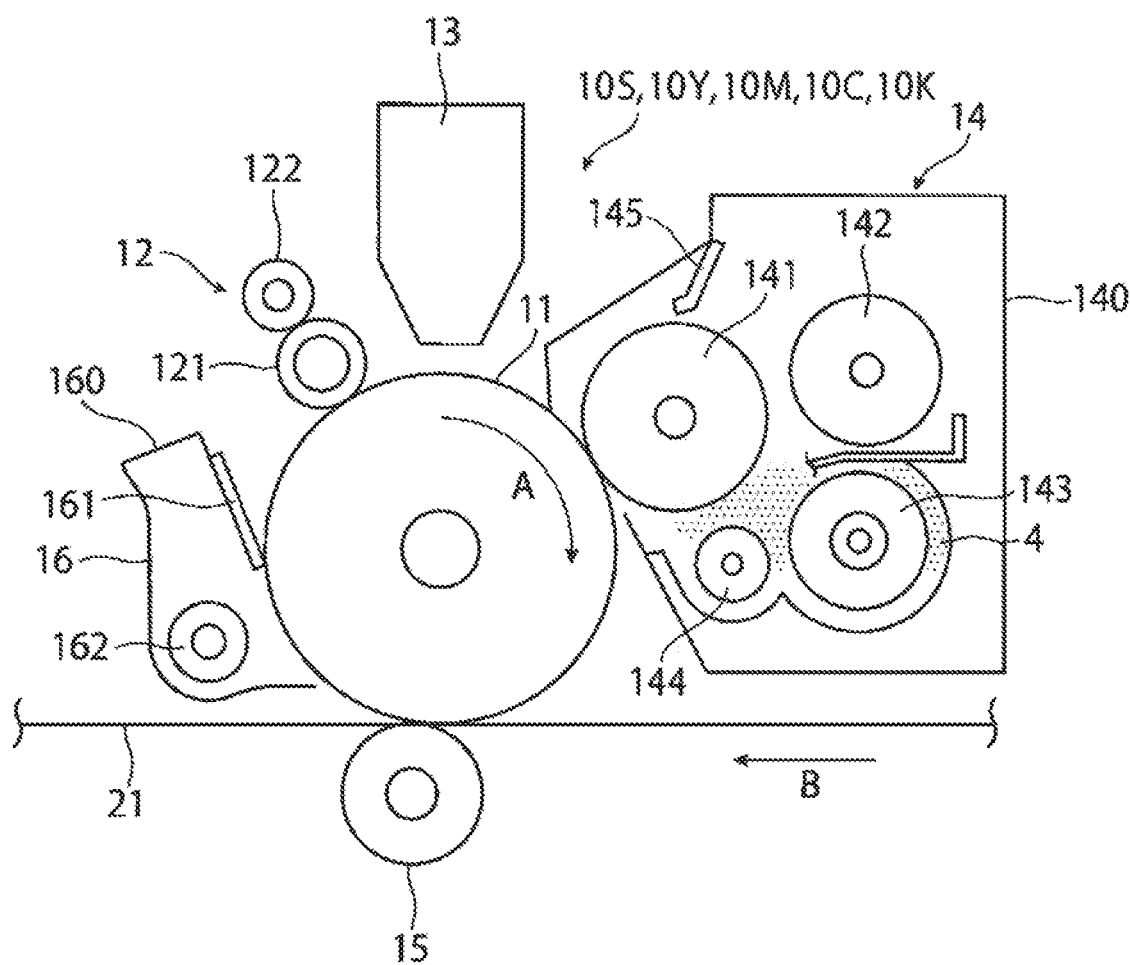
FIG. 2 is a sectional view of an imaging device included in the image forming apparatus according to the exemplary embodiment of the present disclosure.

Referring to FIG. 2, the charging device 12 includes a contact-type charging roller 121, which is positioned in contact with the photoconductor drum 11. The charging device 12 further includes a cleaning roller 122, which is positioned at the back of the charging roller 121 and cleans the circumferential surface of the charging roller 121. The charging device 12 is supplied with a charging voltage. If the developing device 14 employs a reversal development scheme, the charging voltage to be supplied is a voltage or current of a polarity that is the same as the polarity to which the toner to be supplied from the developing device 14 is charged. The charging device 12 may alternatively be a noncontact device such as a scorotron charger, which is positioned apart from the surface of the photoconductor drum 11.

The exposure device 13 is a light-emitting-diode (LED) printhead including a plurality of LEDs, serving as light-emitting devices, arrayed along the axis of the photoconductor drum 11 to form an electrostatic latent image by applying light generated from the image information to the photoconductor drum 11. The exposure device 13 may alternatively be a device configured to perform polarization scanning in the axial direction of the photoconductor drum 11 with a laser beam generated from the image information.

As illustrated in FIG. 2, the developing device 14 (S, Y, M, C, or K) includes a housing 140, which has an opening and a chamber for storing the developer 4. The housing 140 houses elements including the following: a developing roller 141 (an exemplary developer carrier), which carries the developer 4 and transports the developer 4 to a developing area where the developing roller 141 faces the photoconductor drum 11; a supplying auger 142 (an exemplary stirring-and-supplying component), which supplies the developer 4 to and over the developing roller 141 while stirring the developer 4; an admixing auger 143 (an exemplary stirring-and-transporting component), which transports the developer 4 to the supplying auger 142 while stirring the developer 4; a counter auger 144, which receives the developer 4 separated from the developing roller 141 and transports the received developer 4 in a direction opposite to the direction of transport by the admixing auger 143; and a layer-thickness-regulating member 145, which regulates the amount (the thickness of the layer) of the developer 4 to be carried by the developing roller 141. The developing device 14 is supplied with a developing voltage at a point between the developing roller 141 and the photoconductor drum 11 from a power supply device (not illustrated). The developing roller 141, the supplying auger 142, and the admixing auger 143 receive power from a driving device, to be described below, and thus rotate in predetermined directions. The developer 4 for each of the five colors (S, Y, M, C, and K) is a two-component developer composed of a nonmagnetic toner and a magnetic carrier. The configuration of the developing devices 14 will be described in detail separately below.

The developing devices 14 (S, Y, M, C, and K), particularly the developing device 14S for the specific color (S), are detachable from the apparatus body 1a of the image forming apparatus 1. The developing devices 14 (S, Y, M, C, and K) are each exchangeable by the user with a corresponding one of fresh developing devices 14 (Y, M, C, or K) and a fresh developing device 14S for any specific color (S).

The first-transfer devices 15 (S, Y, M, C, and K) are each a contact-type transfer device including a first-transfer roller that rotates by being in contact with the circumferential surface of the photoconductor drum 11 with the intermediate transfer belt 21 interposed therebetween, and are each supplied with a first-transfer voltage. The first-transfer voltage is a direct-current voltage supplied from a power supply device (not illustrated) and having a polarity opposite to the polarity to which the toner is charged.

The drum cleaning devices 16 each include the following: a body 160, which is a casing having an opening in a part thereof; a cleaning plate 161, which is pressed with a predetermined pressure against the circumferential surface of the photoconductor drum 11 at a position past the point of first transfer and thus removes residual matter such as toner particles from the photoconductor drum 11; and a delivering member 162, which is a screw auger or the like that collects the matter such as the toner particles removed by the cleaning plate 161 and delivers the matter to a collecting system (not illustrated). The cleaning plate 161 is a plate member (such as a blade) made of rubber or the like.

Referring to FIG. 1, the intermediate transfer device 20 is positioned below the imaging devices 10 (S, Y, M, C, and K) in the Z direction. The intermediate transfer device 20 includes the following: the intermediate transfer belt 21, which rotates in a direction B in such a manner as to pass through first-transfer positions defined between the photoconductor drums 11 and the respective first-transfer devices 15 (first-transfer rollers); a plurality of belt supporting rollers 22 to 25, which rotatably support the intermediate transfer belt 21 from the inner side in such a manner as to retain the intermediate transfer belt 21 in a desired state; a second-transfer device 30 (an exemplary second-transfer component), which is provided in contact with the outer circumferential surface (the side on which the image is to be carried) of the intermediate transfer belt 21 at a position across from the belt supporting roller 25, and second-transfers the toner images formed on the intermediate transfer belt 21 to a recording sheet 5; and a belt cleaning device 26, which removes residual matter such as toner particles and paper lint from the outer circumferential surface of the intermediate transfer belt 21 at a position past the second-transfer device 30.

The intermediate transfer belt 21 is an endless belt made of, for example, synthetic resin such as polyimide resin or polyamide resin in which a resistance regulator or the like such as carbon black is dispersed. The belt supporting roller 22 serves as a driving roller and as a counter roller for the belt cleaning device 26, and is rotated by a driving device (not illustrated). The belt supporting roller 23 serves as a surface defining roller that defines the image forming surface of the intermediate transfer belt 21. The belt supporting roller 24 serves as a tension applying roller that applies a tension to the intermediate transfer belt 21. The belt supporting roller 25 serves as a counter roller provided across from the second-transfer device 30.

As illustrated in FIG. 1, the second-transfer device 30 is a contact-type transfer device including a second-transfer roller 31, which is supplied with a second-transfer voltage and rotates by being in contact with the outer circumferential surface of the intermediate transfer belt 21 at the second-transfer position in the intermediate transfer device 20 where the intermediate transfer belt 21 is supported by the belt supporting roller 25. The second-transfer roller 31 or the belt supporting roller 25 of the intermediate transfer device 20 is supplied from a power supply device (not illustrated) with a direct-current second-transfer voltage that has a polarity opposite to or the same as the polarity to which the toners are charged.

The fixing device 40 includes a housing (not illustrated), which has an introduction port and a discharge port for the recording sheet 5. The housing houses elements including the following: a heating belt 41, which rotates in a direction represented by the arrow and is heated by a heating component such that the surface thereof is kept at a predetermined temperature; and a pressure roller 42, which is in contact with the heating belt 41 with a predetermined pressure over an area extending substantially in the axial direction of the heating belt 41, and rotates by following the heating belt 41. In the fixing device 40, the area where the heating belt 41 and the pressing roller 42 are in contact with each other serves as a fixing part, where a predetermined fixing process (heating and pressing) is to be performed.

The sheet feeding device 50 is provided below the intermediate transfer device 20 in the Z direction. The sheet feeding device 50 includes a single sheet storage 51 (or a plurality of sheet storages 51), which stores a stack of recording sheets 5 grouped by a predetermined factor such as size or kind; and delivering devices 52 and 53, which deliver the recording sheets 5 one by one from the sheet storage 51. The sheet storage 51 is drawable from, for example, the front face of the apparatus body 1a (the side face toward which the user who is operating the apparatus 1 faces).

Examples of the recording sheet 5 include thin papers, such as plain paper and tracing paper, intended for electrophotographic machines such as copiers and printers; and sheets intended for over-head projectors (OHPs). The surface smoothness of the fixed image may be improved by using a recording sheet 5 having a highly smooth surface: for example, coated paper obtained by coating plain paper with resin or the like; or thick paper, such as paper for printing art, having a relatively heavy basis weight.

The sheet feeding device 50 and the second-transfer device 30 are connected to each other with a sheet feeding path 56, which is provided with a single or plurality of pairs of sheet transporting rollers 54 and 55 and transporting guides (not illustrated), with which the recording sheet 5 fed from the sheet feeding device 50 is transported to the second-transfer position. The pair of sheet transporting rollers 55 provided immediately before the second-transfer position in the sheet feeding path 56 serves as, for example, a pair of rollers (registration rollers) that adjusts the timing of transporting the recording sheet 5. A transporting belt 57 is provided between the second-transfer device 30 and the fixing device 40 so as to receive the sheet 5 having undergone second transfer and exited from the second-transfer device 30 and to transport the sheet 5 to the fixing device 40. A decurling device 58 is provided on the downstream side with respect to the fixing device 40 so as to straighten any curl formed in the recording sheet 5 having undergone fixing in the fixing device 40. The recording sheet 5 having undergone fixing and exited from the decurling device 58 is outputted to a sheet output portion (not illustrated) on one side face of the apparatus body 1a along a sheet output path 60, which extends near a sheet output port provided in the apparatus body 1a of the image forming apparatus 1 and is provided with a pair of sheet output rollers 59.

A transport-path branch 62 extends from the upstream end of the sheet output path 60 in the direction of transport of the recording sheet 5 and is provided with a pair of sheet transporting rollers 61, which receive the recording sheet 5 exited from the decurling device 58 and transports the recording sheet 5 obliquely downward. The lower end of the transport-path branch 62 is connected to a turn-over transport path 64, in which the recording sheet 5 is turned over by pairs of turn-over rollers 63. The upper end of the turn-over transport path 64 is connected to a sheet output path 66 and to a duplex transport path 68. The recording sheet 5 having been turned over in the turn-over transport path 64 and to be outputted to the sheet output portion (not illustrated) is transported along the sheet output path 66, which is provided with a pair of sheet output rollers 65. The recording sheet 5 having been turned over in the turn-over transport path 64 for an operation of forming another image on the back side thereof is transported along the duplex transport path 68, which is provided with pairs of duplex transport rollers 67.

As illustrated in FIG. 1, the image forming apparatus 1 includes a controller 200, which generally controls the operation of the image forming apparatus 1. The controller 200 includes a central processing unit (CPU), a read-only memory (ROM), a random access memory (RAM), buses connecting the foregoing to one another, and a communication interface.

Operation of Image Forming Apparatus

A basic image forming operation performed by the image forming apparatus 1 will now be described.

Herein, an operation in a specific-color and full-color mode will be described, in which a full-color image composed of toner images in the four respective colors (Y, M, C, and K) and a specific-color image are formed by using the five imaging devices 10 (S, Y, M, C, and K).

When the image forming apparatus 1 receives image information and command information requesting an operation of forming (printing) a full-color image from a device such as a personal computer or an image reading device (not illustrated) via a communication unit (not illustrated), the controller 200 activates relevant devices including the five imaging devices 10 (S, Y, M, C, and K), the intermediate transfer device 20, the second-transfer device 30, and the fixing device 40.

In the imaging devices 10 (S, Y, M, C, and K), as illustrated in FIG. 1, the photoconductor drums 11 first rotate in the direction A, and the charging devices 12 charge the surfaces of the photoconductor drums 11 to a predetermined potential of a predetermined polarity (in the present exemplary embodiment, negative polarity). Subsequently, the exposure devices 13 generate light beams from pieces of image information on the respective color components (S, Y, M, C, and K) obtained through the conversion of image information inputted to the image forming apparatus 1, and apply the light beams to the charged surfaces of the photoconductor drums 11, whereby electrostatic latent images for the respective color components are formed as a predetermined potential difference on the surfaces of the photoconductor drums 11.

Subsequently, in the imaging devices 10 (S, Y, M, C, and K), the toners having the respective colors (S, Y, M, C, and K) and charged to the predetermined polarity (negative polarity) are supplied from the developing rollers 141 to the electrostatic latent images for the respective color components on the photoconductor drums 11, whereby the electrostatic latent images are developed with the toners that are electrostatically attracted thereto. Thus, the electrostatic latent images for the respective color components on the photoconductor drums 11 are visualized with the toners having the respective colors into toner images in the five respective colors (S, Y, M, C, and K).

The toner images in the respective colors on the photoconductor drums 11 of the imaging devices 10 (S, Y, M, C, and K) are transported to the respective first-transfer positions, where the first-transfer devices 15 (S, Y, M, C, and K) first-transfer the toner images in the respective colors to the intermediate transfer belt 21 of the intermediate transfer device 20 such that the toner images are superposed one on top of another on the intermediate transfer belt 21 rotating in the direction B.

In the imaging devices 10 (S, Y, M, C, and K) having completed first transfer, the drum cleaning devices 16 clean the surfaces of the photoconductor drums 11 by scraping off residual matter from the photoconductor drums 11. Thus, the imaging devices 10 (S, Y, M, C, and K) are ready for the next imaging operation.

Subsequently, in the intermediate transfer device 20, the intermediate transfer belt 21 carrying the toner images first-transferred thereto rotates to transport the toner images to the second-transfer position. Meanwhile, in the sheet feeding device 50, a predetermined recording sheet 5 is fed into the sheet feeding path 56 synchronously with the imaging operation. In the sheet feeding path 56, the pair of sheet transporting rollers 55 serving as a pair of registration rollers supplies the recording sheet 5 to the second-transfer position synchronously with the timing of transfer.

At the second-transfer position, the second-transfer device 30 second-transfers the set of toner images on the intermediate transfer belt 21 to the recording sheet 5. In the intermediate transfer device 20 having completed second transfer, the belt cleaning device 26 removes residual matter such as toner particles from the surface of the intermediate transfer belt 21 having undergone second transfer.

Subsequently, the recording sheet 5 now having the set of toner images second-transferred thereto is released from the intermediate transfer belt 21 and is transported to the fixing device 40 by the transporting belt 57. In the fixing device 40, the recording sheet 5 having undergone second transfer is made to pass through the contact area defined between the heating belt 41 and the pressing roller 42 that are rotating, whereby the set of unfixed toner images on the recording sheet 5 undergoes the predetermined fixing process (heating and pressing) and is fixed to the recording sheet 5. Lastly, the recording sheet 5 having undergone fixing is decurled by the decurling device 58 and is outputted by the pair of sheet output rollers 59 to the sheet output portion (not illustrated) provided on, for example, one side face of the apparatus body 1*a*.

If another image is to be formed on the back side of the recording sheet 5, the recording sheet 5 having the image formed as above on one side thereof is not outputted to the sheet output portion (not illustrated) but is transported into the turn-over transport path 64 for turning over the recording sheet 5 and then through the duplex transport path 68 up to the second-transfer device 30, where another set of toner images are transferred to the back side of the recording sheet 5. The recording sheet 5 now having the set of toner images transferred to the back side thereof is transported by the transporting belt 57 to the fixing device 40, where the recording sheet 5 undergoes the fixing process (heating and pressing). Then, the recording sheet 5 is outputted by the pair of sheet output rollers 59 to the sheet output portion (not illustrated) provided on the side face of the image forming apparatus 1.

Through the above process, the recording sheet 5 having on one side or each of the two sides thereof an image obtained as a combination of a full-color image and a specific-color image, i.e., a combination of toner images in the five respective colors, is outputted.

Configuration of Driving Device

Figure 3:
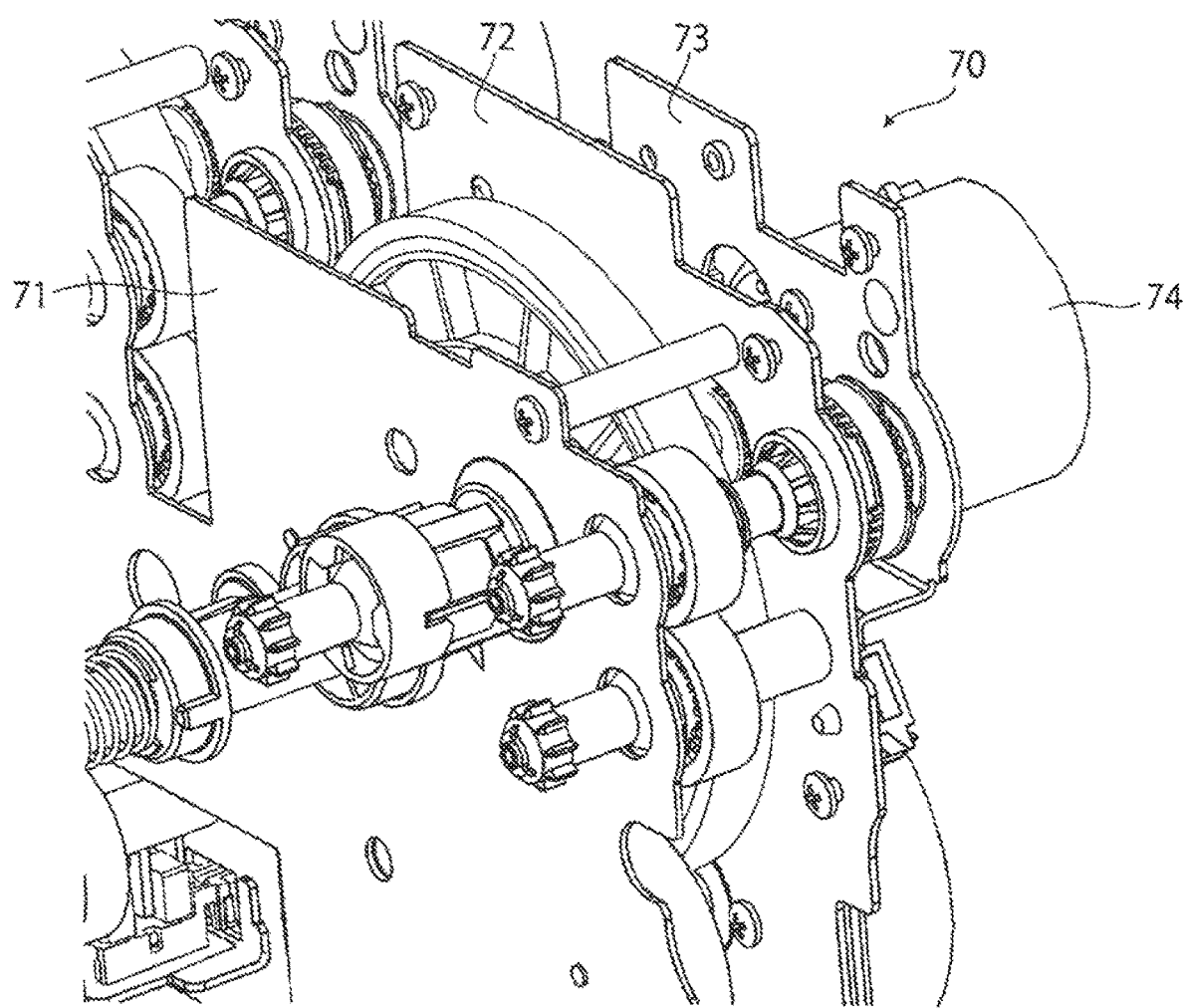
FIG. 3 is a perspective view of the driving device according to the exemplary embodiment of the present disclosure.
Figure 4:
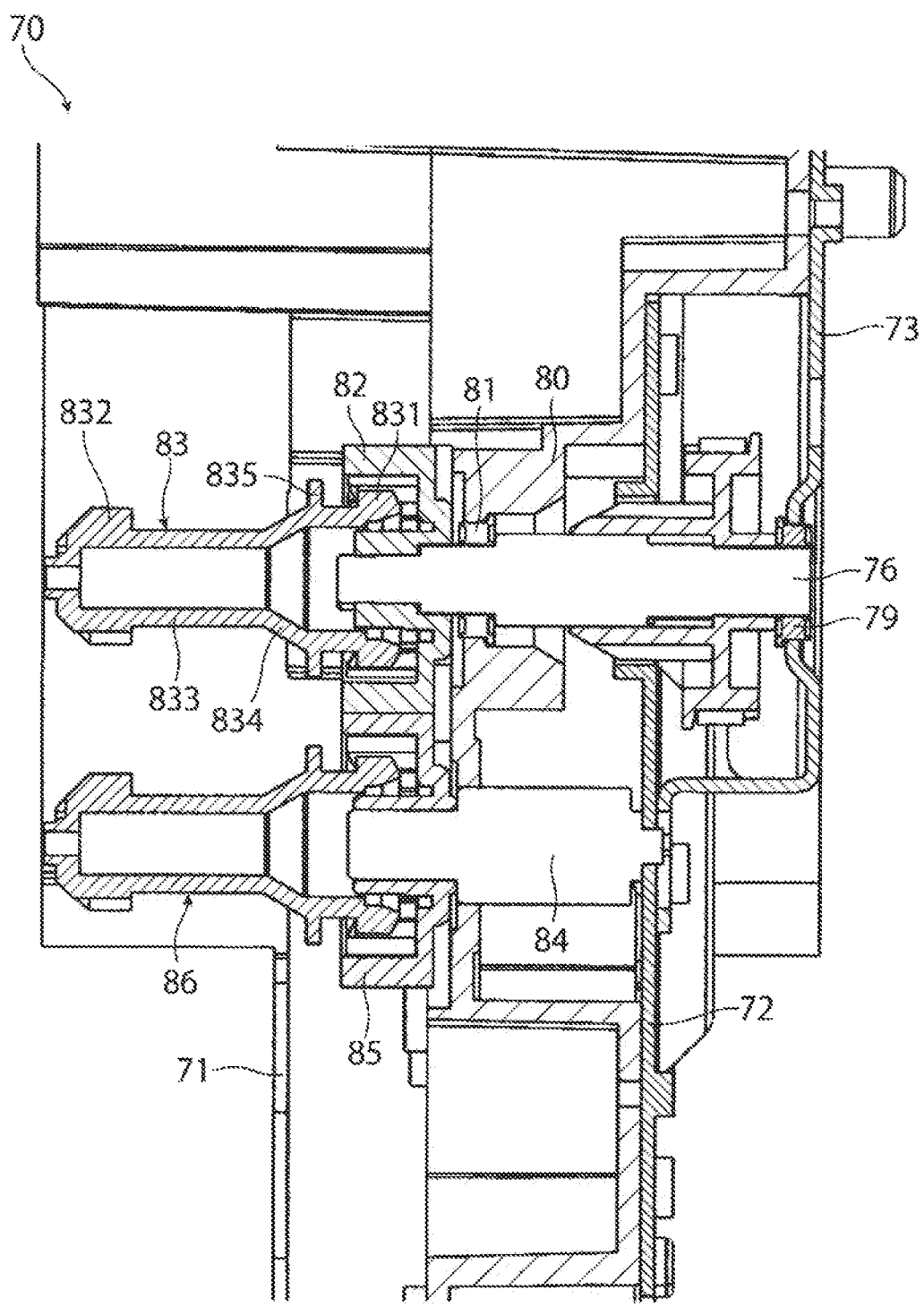
FIG. 4 is a sectional view of the driving device according to the exemplary embodiment of the present disclosure.

FIGS. 3 and 4 illustrate relevant elements of a driving device 70, which is applied to the image forming apparatus 1 according to the present exemplary embodiment.

The driving device 70 drives the developing device 14 included in each of the imaging devices 10 (S, Y, M, C, and K), illustrated in FIG. 1, provided for the specific color (S), yellow (Y), magenta (M), cyan (C), and black (K). In other words, the developing devices 14 of the imaging devices 10 (S, Y, M, C, and K) are provided with respective driving devices 70.

Figure 5:
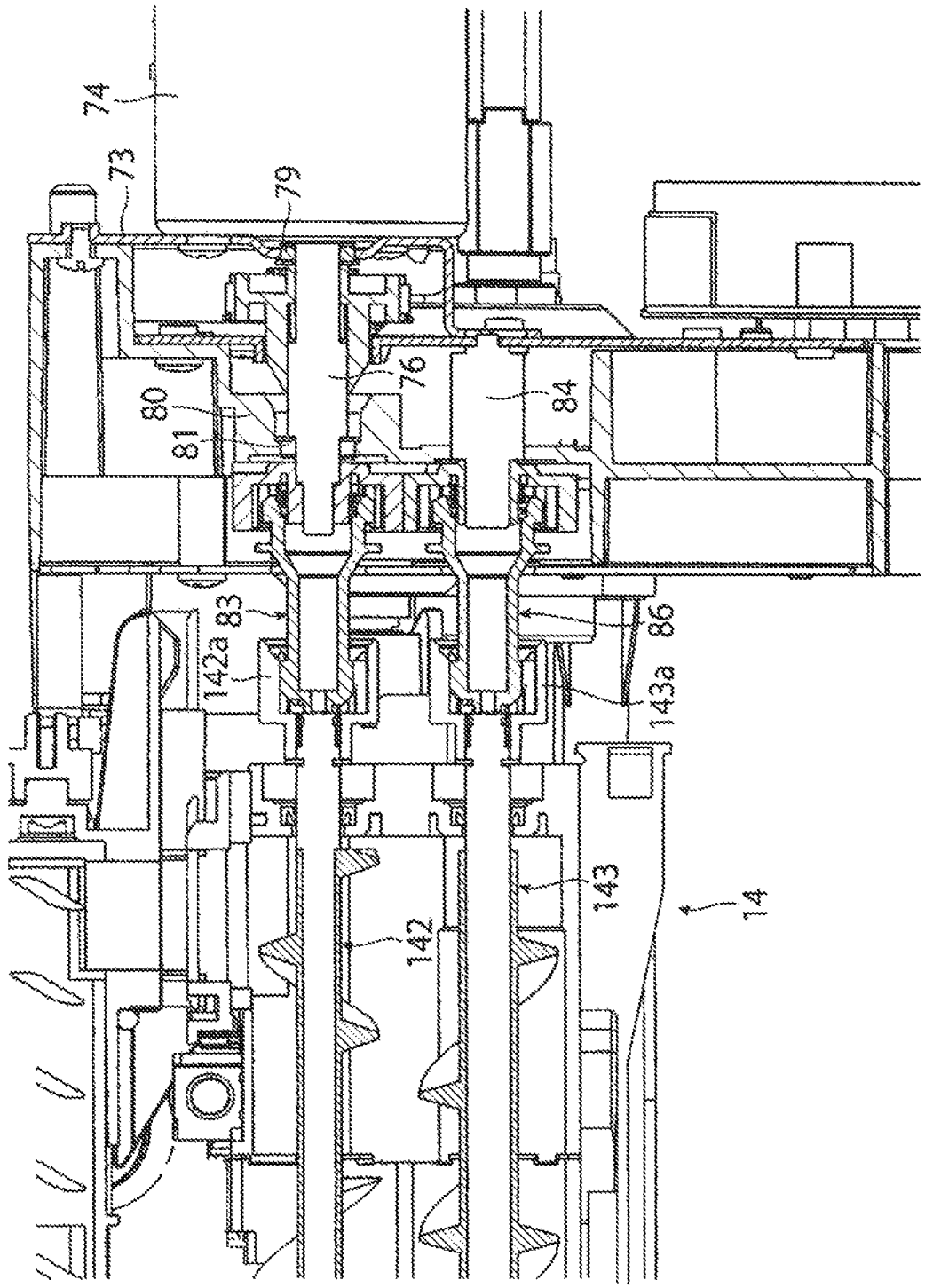
FIG. 5 is a sectional view of relevant elements of the image forming apparatus to which the imaging device according to the exemplary embodiment of the present disclosure is applied.

Referring to FIGS. 3 and 4, each driving device 70 includes first to third supporting frames 71 to 73, which are made of sheet metal or the like and are arranged at predetermined intervals. Referring to FIG. 5, the third supporting frame 73 is provided with an auger motor 74 (an exemplary drive source), which drives relevant elements including the supplying auger 142 and the admixing auger 143 of the developing device 14 to rotate.

FIG. 4 illustrates the driving device 70 with the developing device 14 detached from the apparatus body 1*a* of the image forming apparatus 1. FIG. 5 illustrates the driving device 70 with the developing device 14 attached to the apparatus body 1*a* of the image forming apparatus 1.

Figure 6:
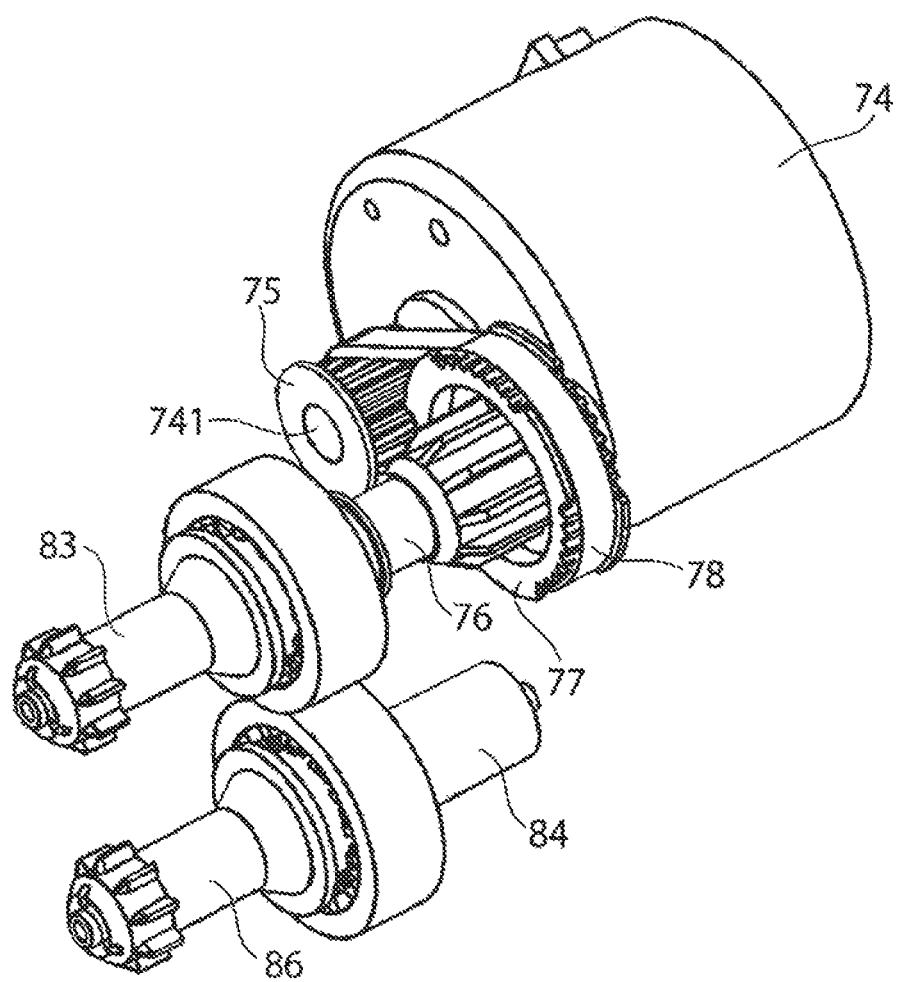
FIG. 6 is a perspective view of relevant elements of the driving device according to the exemplary embodiment of the present disclosure.

Referring to FIG. 6, the auger motor 74 includes a driving shaft 741, on which a driving pulley 75 is fixedly fitted. A timing belt 78 is stretched between the driving pulley 75 and a follower pulley 77, which is fixedly fitted on a driving shaft 76. Referring to FIG. 5, the driving shaft 76 is provided at such a position as to face the rear end of the supplying auger 142 of the developing device 14 in the axial direction of the supplying auger 142. Referring to FIG. 4, the driving shaft 76 is rotatably supported at a proximal part in the axial direction thereof by the third supporting frame 73 with the aid of a bearing member 79 and at a distal part in the axial direction thereof by a supporting housing 80, provided between the first supporting frame 71 and the second supporting frame 72, with the aid of a bearing member 81.

The driving shaft 76 is provided at the distal end thereof with a driving gear 82, which is an exemplary gear according to the present exemplary embodiment. The supplying auger 142 of the developing device 14 is detachably attached to a coupling 83, which is held by the driving gear 82 such that a rotational driving force generated by the auger motor 74 is transmitted through the coupling 83 to relevant elements of the developing device 14 including the supplying auger 142 and the admixing auger 143.

Figure 7:
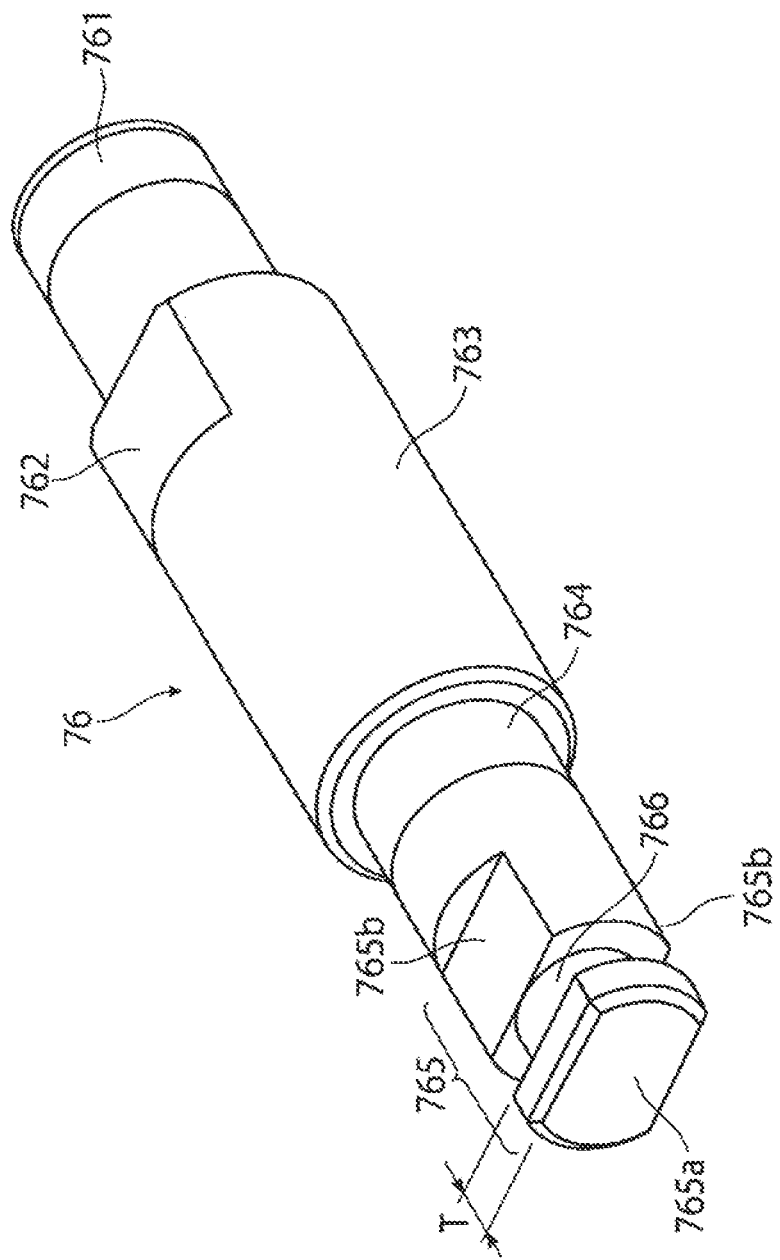
FIG. 7 is a perspective view of a driving shaft.
Figure 8:
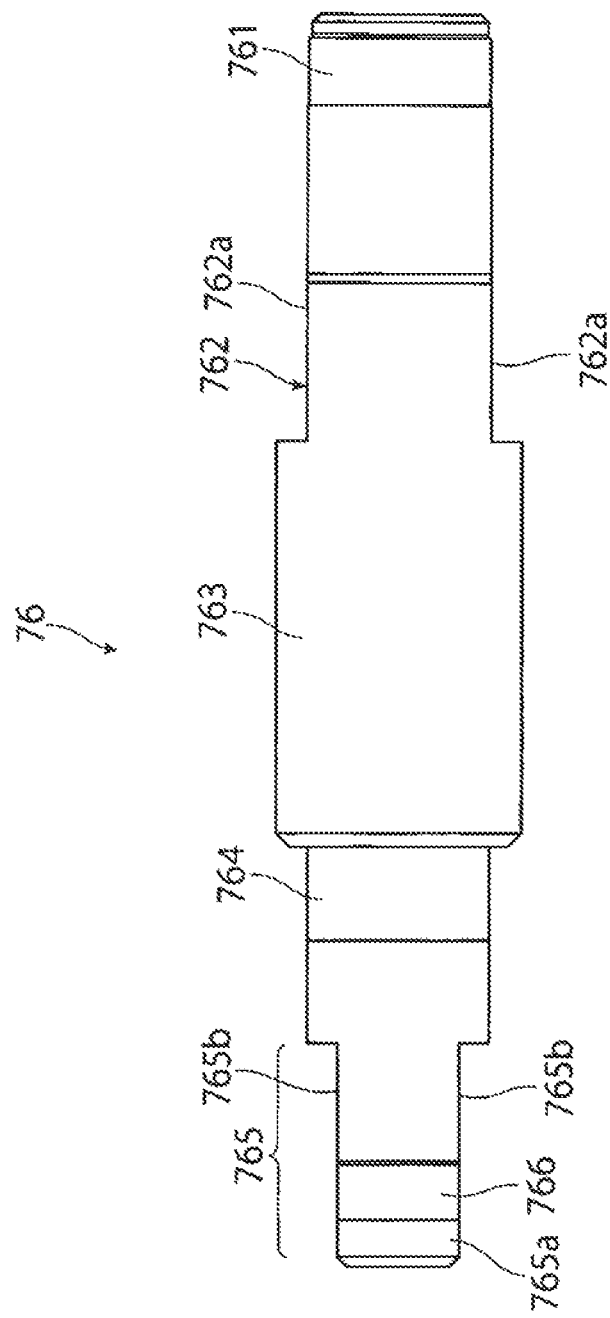
FIG. 8 is a side view of the driving shaft.

Referring to FIGS. 7 and 8, the driving shaft 76 is a substantially round columnar member made of metal such as stainless steel. The driving shaft 76 includes the following: a first round columnar portion 761, which forms the proximal part of the driving shaft 76 and is rotatably supported by the bearing member 79; a first D-cut portion (a portion having a D-shaped cut) 762, which resides on the distal side with respect to the first round columnar portion 761 and on which the follower pulley 77 is fitted in such a manner as to be prevented from rotating; a second round columnar portion 763, which forms an axially central part of the driving shaft 76 and has a larger outside diameter than the first round columnar portion 761; a third round columnar portion 764, which resides on the distal side with respect to the second round columnar portion 763, has a smaller outside diameter than the second round columnar portion 763, and is rotatably supported by the bearing member 81; a second D-cut portion 765, which forms the distal end of the driving shaft 76; and a fourth round columnar portion 766, which is provided adjacent to and on the proximal side with respect to a head 765*a*, included in the second D-cut portion 765, and has an outside diameter smaller than or equal to the outside diameter of the second D-cut portion 765. In the present exemplary embodiment, the outside diameter of the fourth round columnar portion 766 is equal to the distance between two D-cut facets 765*b*, which are formed in the second D-cut portion 765.

The second D-cut portion 765 of the driving shaft 76 is formed as a double D-cut portion provided at the distal end of the driving shaft 76 such that the two D-cut facets 765*b* extend parallel to the center axis of the driving shaft 76 and are positioned opposite each other. As with the second D-cut portion 765, the first D-cut portion 762 is formed as a double D-cut portion provided near the proximal end of the driving shaft 76 such that two D-cut facets 762*a* extend parallel to the center axis of the driving shaft 76 and are positioned opposite each other. Alternatively, the first and second D-cut portions 762 and 765 may each be a single D-cut portion provided near or at a corresponding one of the axial ends of the driving shaft 76 such that one D-cut facet extends parallel to the center axis of the driving shaft 76. Note that the second D-cut portion 765 formed as a double D-cut portion more assuredly transmits the torque of the driving shaft 76 to the driving gear 82 than a second D-cut portion formed as a single D-cut portion.

The head 765*a* of the second D-cut portion 765 of the driving shaft 76 has the same sectional shape as the body (the portion excluding the head 765*a*) of the second D-cut portion 765. Specifically, the head 765*a* of the second D-cut portion 765 is spaced apart from the body of the second D-cut portion 765 by the fourth round columnar portion 766 interposed therebetween. As described above, the fourth round columnar portion 766 having an outside diameter smaller than or equal to the outside diameter of the second D-cut portion 765 is interposed between the body of the second D-cut portion 765 and the head 765a. The head 765a of the second D-cut portion 765 may have any axial length, i.e., thickness T, as long as the head 765a is mechanically strong enough to stop the driving gear 82 to be brought into contact therewith from coming off the driving shaft 76.

Referring to FIGS. 4 and 5, adjacent to the driving shaft 76, a supporting shaft 84 is provided parallel to the driving shaft 76 and at such a position as to face the rear end of the admixing auger 143 of the developing device 14 in the axial direction of the admixing auger 143. The supporting shaft 84 is supported at a proximal part thereof by the second supporting frame 72 in such a manner as to be prevented from rotating and is also supported at a distal part thereof by the supporting housing 80. The supporting shaft 84 is provided at the distal end thereof with a follower gear 85, which is in mesh with the driving gear 82 in such a manner as to receive the driving force from the driving gear 82 to rotate on the supporting shaft 84. The distal part of the supporting shaft 84 has a round columnar shape with a smaller outside diameter than a central part of the supporting shaft 84, whereby a step with which the follower gear 85 is to be brought into contact is formed between the distal part and the central part. The follower gear 85 may be fixed to the supporting shaft 84 if the supporting shaft 84 is rotatably supported by the second supporting frame 72 and the supporting housing 80. The admixing auger 143 of the developing device 14 is detachably attached to a coupling 86, which is held by the follower gear 85 such that the rotational driving force is transmitted through the coupling 86 to the admixing auger 143.

Figure 9:
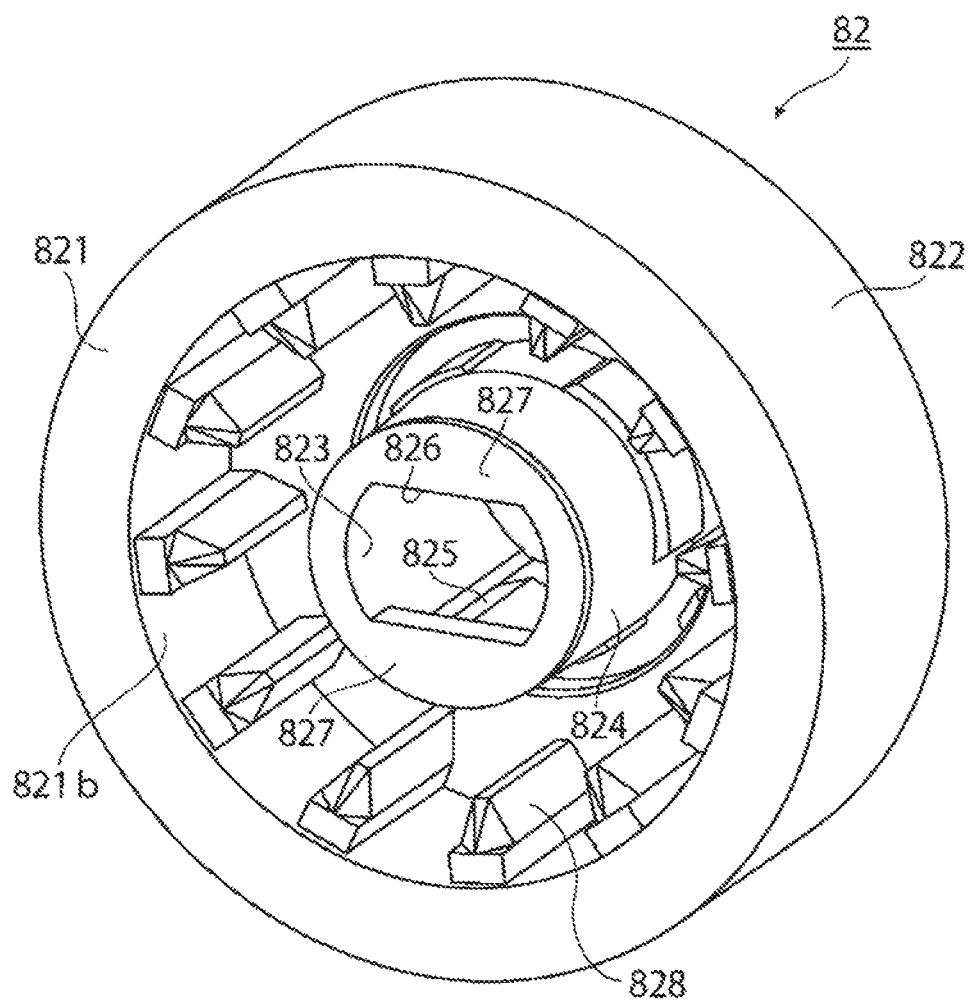
FIG. 9 is a perspective view of a gear according to the exemplary embodiment of the present disclosure.
Figure 10:
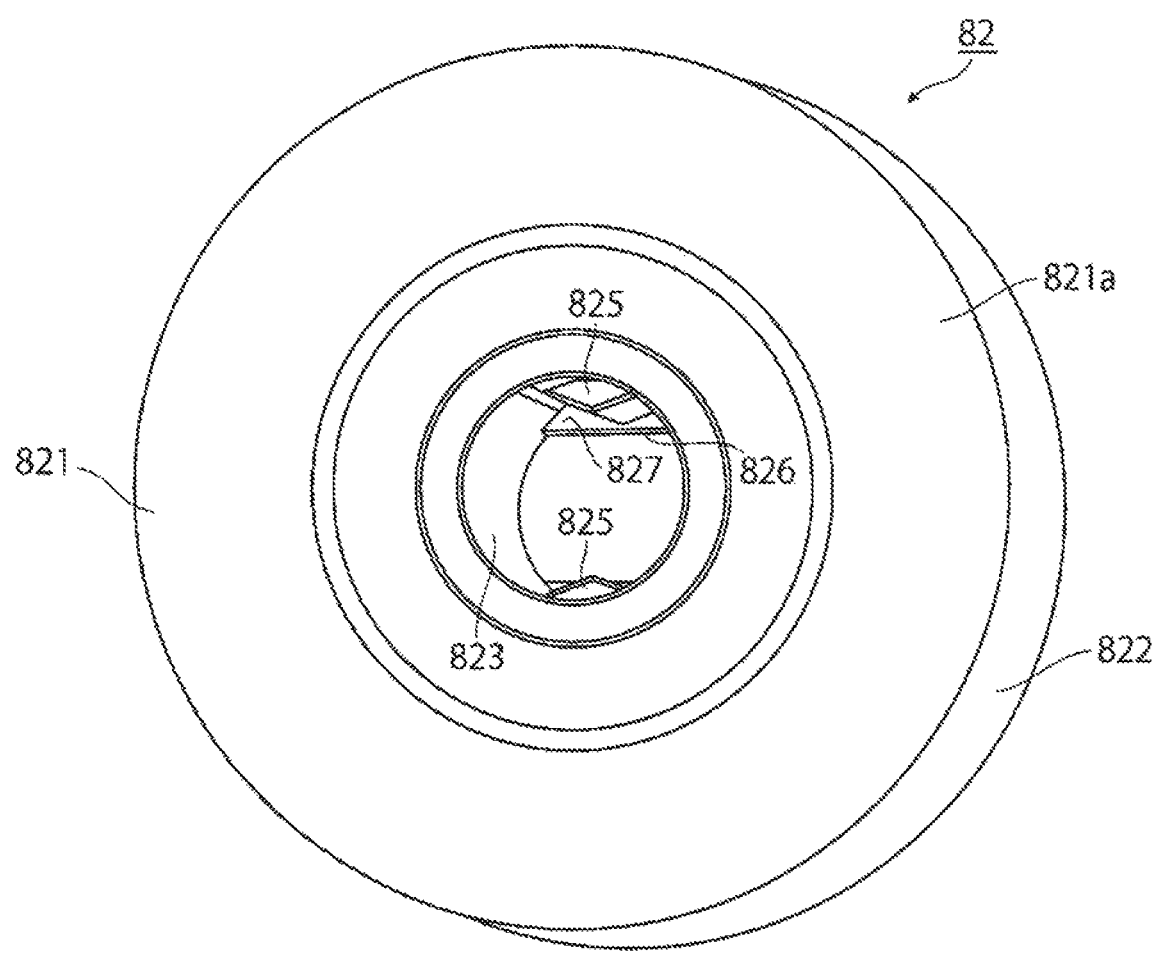
FIG. 10 is another perspective view of the gear according to the exemplary embodiment of the present disclosure.

Referring to FIGS. 9 and 10, the driving gear 82 includes a gear body 821, which has a cylindrical shape that is short in the axial direction, with the rear side thereof in the Y direction being closed to form a surface 821a and with the front side thereof in the Y direction being open to form an inner circumferential surface 821b, leaving a tooth portion 822. The tooth portion 822 is provided over the entire outer circumferential surface of the gear body 821 of the driving gear 82 and includes teeth each extending obliquely with respect to the axial direction, whereby the driving gear 82 acts as a helical gear. When the driving gear 82 that acts as a helical gear rotates together with the driving shaft 76 and transmits the driving force to the follower gear 85, a thrust that is determined by the direction of rotation of the driving gear 82 and the angle of the teeth in the tooth portion 822 is generated between the driving gear 82 and the follower gear 85. In the present exemplary embodiment, the thrust generated by the rotation of the driving gear 82 is set to act toward the distal end of the driving shaft 76, i.e., in a direction in which the driving gear 82 would come off the driving shaft 76. In this respect, as to be described below, the driving gear 82 is configured to be prevented from coming off the driving shaft 76 while being rotated. Meanwhile, the follower gear 85 is in mesh with the driving gear 82 and is subjected to a reaction force acting as a thrust in the opposite direction, i.e., the direction away from the distal end of the supporting shaft 84 (a direction in which the follower gear 85 is prevented from coming off the supporting shaft 84). The driving gear 82 and the follower gear 85 are each a single solid member formed of synthetic resin by injection molding or the like.

The driving gear 82 includes a cylindrical receiving portion 824 (an exemplary stopping portion), which extends in the axial direction of and at the center of the gear body 821 and has a through-hole 823, in which the driving shaft 76 is fitted in such a manner as to transmit the driving force to the driving gear 82 while being allowed to move in the circumferential direction. The through-hole 823 has an inside diameter that matches the outside diameter of the second D-cut portion 765 of the driving shaft 76 so that the second D-cut portion 765 is insertable into the through-hole 823.

Figure 11:
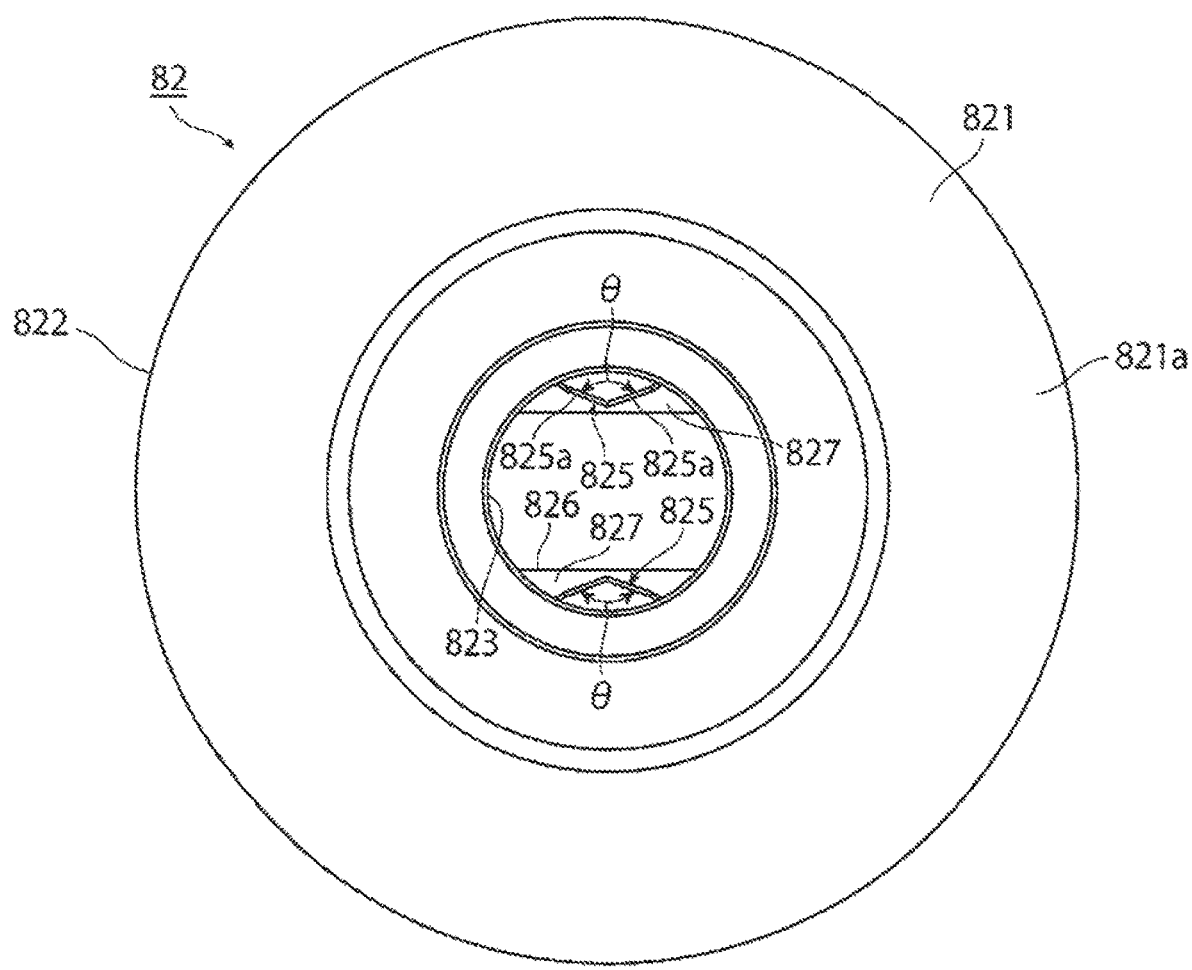
FIG. 11 is a front view of the gear according to the exemplary embodiment of the present disclosure.

As illustrated in FIGS. 9 and 10, the driving gear 82 has projections 825 (exemplary allowing portions), which are provided on the inner circumferential surface of the through-hole 823 and receive a driving torque from the driving shaft 76 while allowing the driving shaft 76 to move in the circumferential direction. Referring to FIG. 11, the projections 825 each have a substantially isosceles triangular shape in sectional view, with two side faces 825a forming a vertex angle θ that is smaller than 180 degrees. The projections 825 are provided at opposite positions, at 180 degrees with respect to each other, on the inner circumferential surface of the through-hole 823. With the second D-cut portion 765 of the driving shaft 76 positioned in the through-hole 823, the projections 825 allow the driving shaft 76 to move in the circumferential direction (to rotate within a limited angular range) but transmit the driving torque when coming into contact with the second D-cut portion 765, unlike a case of projections each having a 180-degree flat top with no vertex.

Figure 12:
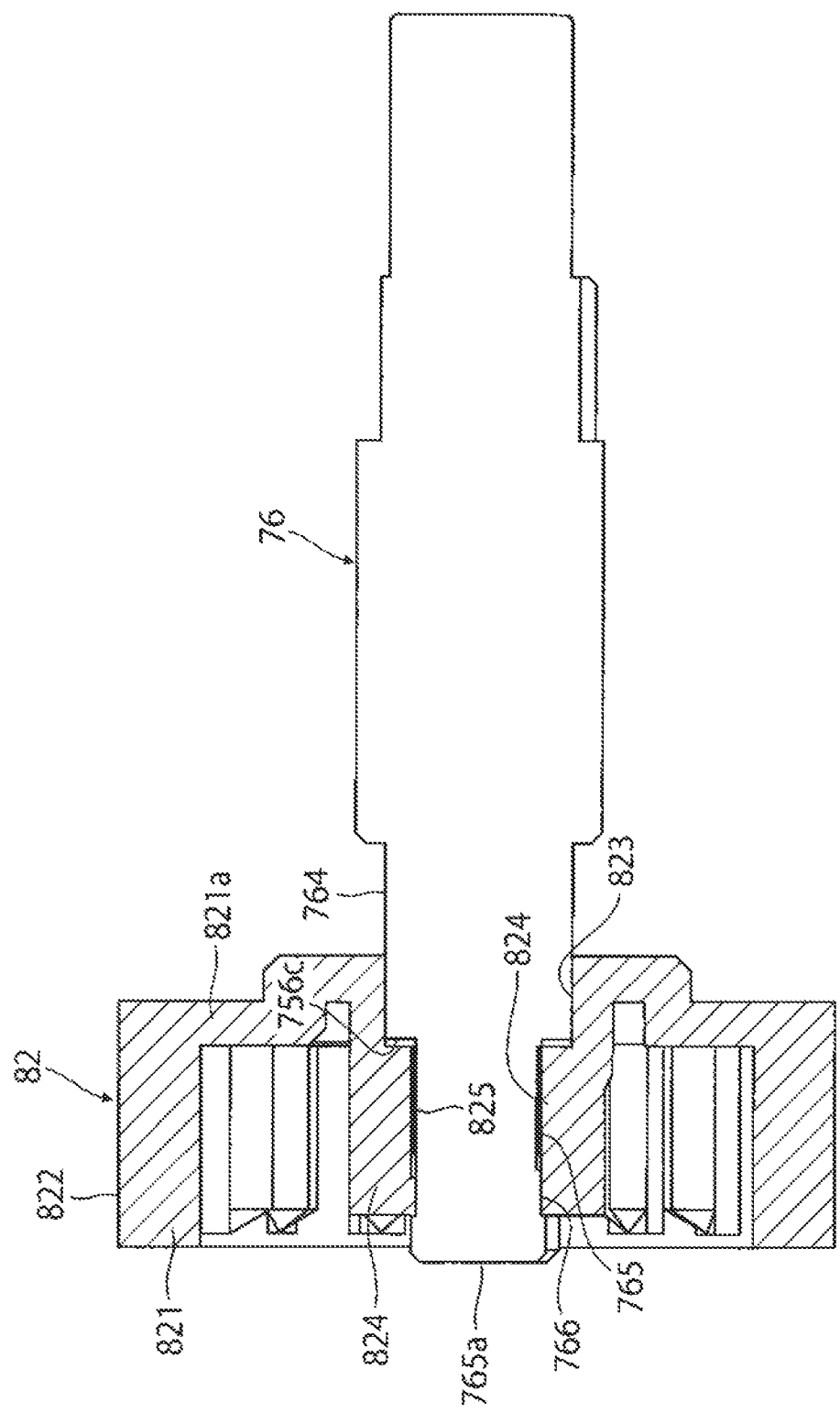
FIG. 12 is a sectional view of the driving shaft with a driving gear attached thereto.

As illustrated in FIGS. 9 and 10, the receiving portion 824 of the driving gear 82 has at the distal end thereof contact walls 827, which close portions of the through-hole 823, leaving an opening 826 (an exemplary stopping portion), which has the same sectional shape as the head 765a of the driving shaft 76. The contact walls 827 each have a thickness that is smaller than the length of the fourth round columnar portion 766 of the driving shaft 76. The positions of the contact walls 827 at the distal end of the receiving portion 824 are set such that, as illustrated in FIG. 12, when the driving shaft 76 inserted into the through-hole 823 of the driving gear 82 comes into contact at facets 765c of the second D-cut portion 765 thereof with end faces of the projections 825 of the driving gear 82 in the axial direction, the contact walls 827 are positioned at the fourth round columnar portion 766 of the driving shaft 76. Therefore, with the driving gear 82 fitted on the driving shaft 76, the driving shaft 76 is allowed to move in the circumferential direction until the second D-cut portion 765 comes into contact with corresponding ones of the side faces 825a of the projections 825 of the driving gear 82, without coming into contact with the contact walls 827 at the opening 826.

Figure 13:
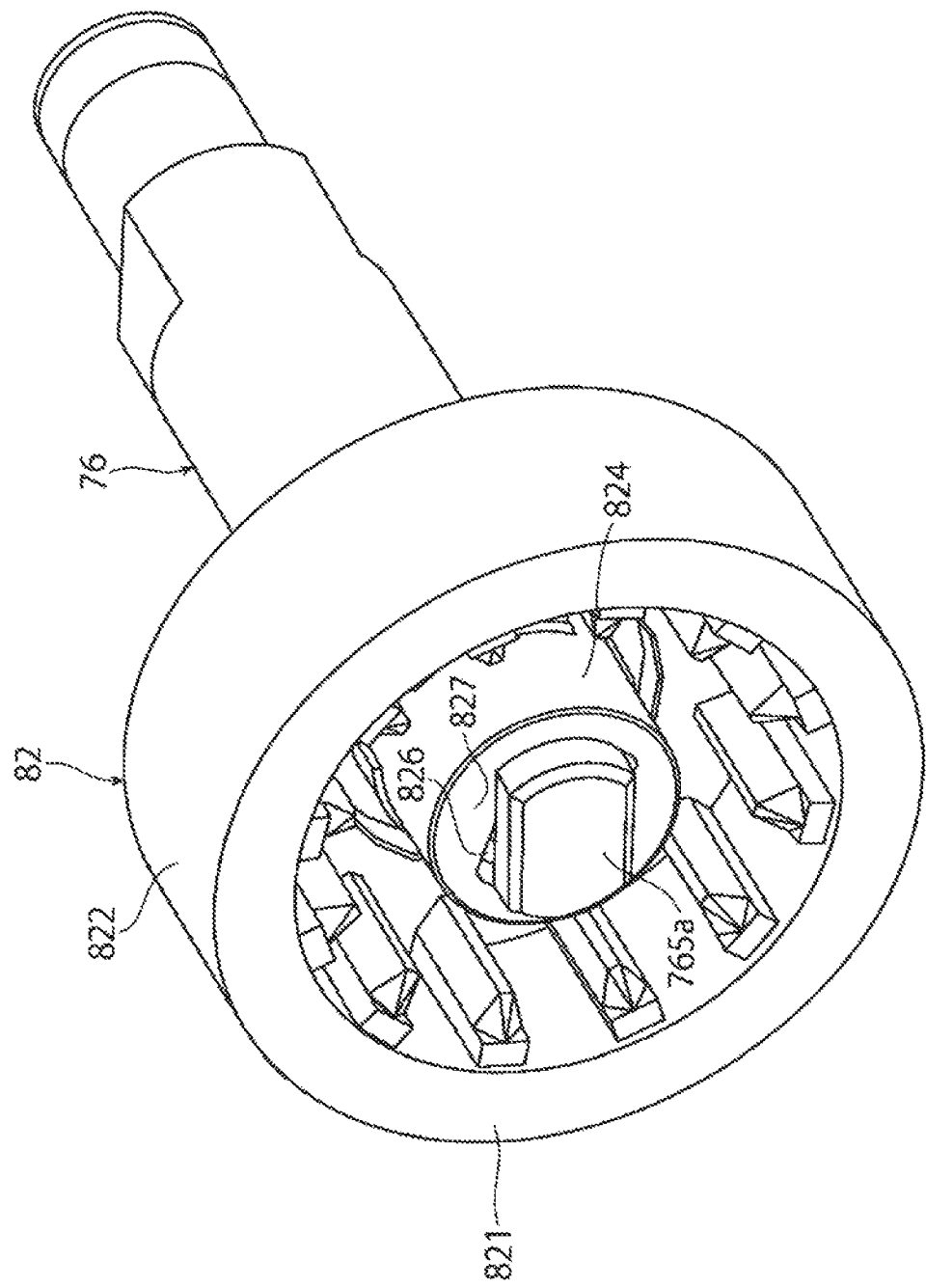
FIG. 13 is a perspective view of the driving shaft with the driving gear attached thereto and in an active state.

Referring to FIG. 13, as the second D-cut portion 765 of the driving shaft 76 moves to come into contact with corresponding ones of the side faces 825a of the projections 825 of the driving gear 82, the orientation of the head 765a of the second D-cut portion 765 is shifted in the circumferential direction with respect to the opening 826 of the driving gear 82. In such a state, when the driving gear 82 receives a thrust acting toward the distal end of the driving shaft 76, the head 765a of the second D-cut portion 765 comes into contact with the contact walls 827 at the opening 826 of the driving gear 82, whereby the driving gear 82 is prevented from coming off the driving shaft 76.

Referring to FIG. 9, the driving gear 82 has on the inner circumferential surface 821b of the tooth portion 822 thereof internal teeth 828, which are spur gear teeth for retaining the coupling 83 when meshed therewith. The ends of the internal teeth 828 on the distal side in the axial direction of the driving gear 82 are tapered for smooth meshing with the coupling 83.

Figure 14:
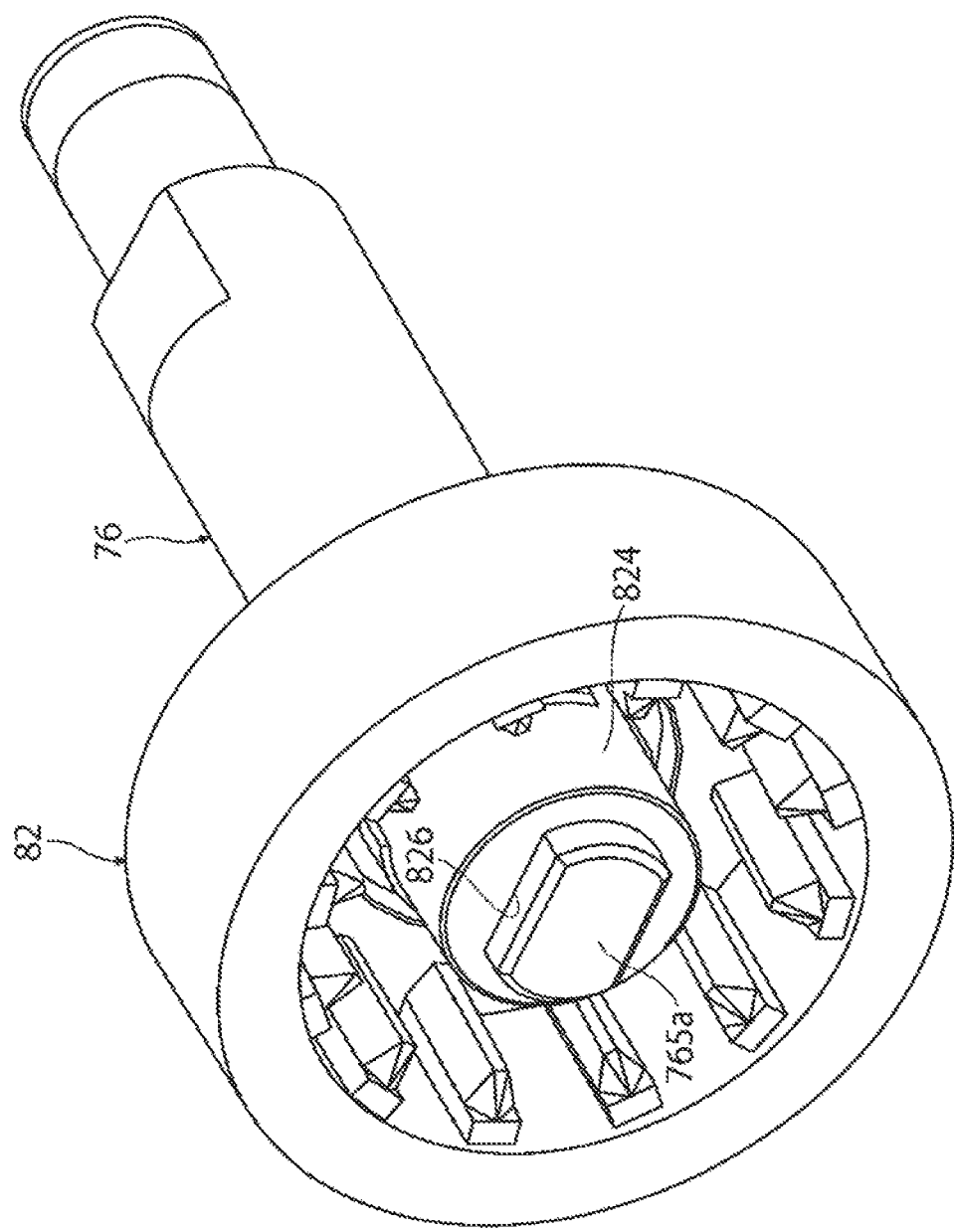
FIG. 14 is a perspective view of the driving shaft with the driving gear attached thereto and in a state at the completion of assembly.

Referring to FIG. 14, at the time of assembly of the driving device 70, the driving gear 82 is attached to the driving shaft 76 by simply fitting the receiving portion 824 of the gear body 821 onto the second D-cut portion 765 at the distal end of the driving shaft 76.

Referring to FIG. 4, the follower gear 85 have the same configuration as the driving gear 82, except that a receiving portion provided in a gear body of the follower gear 85 has a cylindrical shape with no stopping portions. When the follower gear 85 rotates, a thrust is generated in the direction opposite to the direction of the thrust generated on the driving gear 82, whereby the follower gear 85 comes into contact with and is stopped by a step formed on the supporting shaft 84.

The couplings 83 and 86 are configured to engage with respective slave couplings 142a and 143a, which are provided at the proximal ends of the supplying auger 142 and the admixing auger 143, respectively, of the developing device 14, so that the driving force generated by the driving device 70 is transmittable to the developing device 14. When the developing device 14 is to be detached from the apparatus body 1a of the image forming apparatus 1, the couplings 83 and 86 are disengaged from the slave couplings 142a and 143a.

The couplings 83 and 86 have the same configuration. Herein, the coupling 83 will be described. As illustrated in FIGS. 4 and 6, the coupling 83 has a substantially cylindrical shape. The coupling 83 has on the outer circumferential surface at the proximal end thereof first spur gear teeth 831, which are in mesh with the internal teeth 828 of the driving gear 82.

The coupling 83 further has on the outer circumferential surface at the distal end thereof second spur gear teeth 832, which are in mesh with the slave coupling 142a provided at the proximal end of the supplying auger 142 of the developing device 14.

The coupling 83 includes a middle cylindrical portion 833; a tapered portion 834, whose outside diameter increases toward the proximal end thereof; and an annular flange portion 835, which projects radially outward from the proximal end of the tapered portion 834.

Operation of Driving Device

In the image forming apparatus 1 illustrated in FIG. 1 to which the driving device 70 according to the present exemplary embodiment is applied, the developing device 14 of each of the five imaging devices 10 (S, Y, M, C, and K) for the specific color (S), yellow (Y), magenta (M), cyan (C), and black (K) is configured as an exchangeable component that is detachably attached to the apparatus body 1a. In particular, the developing device 14S for the specific color (S) is exchangeable so that an image in any desired specific color (S) is formable.

The developing device 14 is detachable from the apparatus body 1a of the image forming apparatus 1 by unfastening a component (not illustrated) that fastens the developing device 14 and drawing the developing device 14 from the apparatus body 1a frontward in the Y direction. In this process, the slave couplings 142a and 143a of the developing device 14 are disengaged from the couplings 83 and 86 of the driving device 70, whereby the transmission of the driving force is disabled, and the developing device 14 is allowed to be detached.

On the other hand, when the developing device 14 is attached to the apparatus body 1a of the image forming apparatus 1, the slave couplings 142a and 143a provided at the rear face of the developing device 14 are made to engage with the respective couplings 83 and 86 included in the driving device 70, whereby the transmission of the driving force from the driving device 70 to the developing device 14 is enabled.

As illustrated in FIG. 5, the driving device 70 includes the driving gear 82 formed as a helical gear and provided at the distal end of the driving shaft 76, and the follower gear 85 formed as a helical gear and being in mesh with the driving gear 82, so as to transmit a rotational driving force generated by the auger motor 74 to relevant elements of the developing device 14 including the supplying auger 142 and the admixing auger 143, and to rotate the foregoing.

Since the driving gear 82 is provided at the distal end of the driving shaft 76 in such a manner as to engage with the coupling 83, it is difficult to employ a known stopping component, such as an E ring, as a prevention of the coming off of the driving gear 82 from the driving shaft 76.

In the driving gear 82 according to the present exemplary embodiment, as illustrated in FIGS. 9 and 10, the gear body 821 has the projections 825 provided in the through-hole 823 in such a manner as to allow the driving shaft 76 to move in the circumferential direction. Furthermore, the receiving portion 824 of the driving gear 82 has, at the distal end of the through-hole 823, the opening 826 that allows the head 825a of the second D-cut portion 765 of the driving shaft 76 to pass through.

Therefore, when the driving shaft 76 receives the rotational driving force from the auger motor 74 and starts to rotate, the driving gear 82 first allows the driving shaft 76 to move in the circumferential direction for a short time before the second D-cut portion 765 of the driving shaft 76 comes into contact with the side faces 825a of the projections 825 of the driving gear 82.

When the second D-cut portion 765 of the driving shaft 76 comes into contact with the side faces 825a of the projections 825 of the driving gear 82 and the driving gear 82 starts to rotate together with the driving shaft 76, a thrust generated by the meshing between the driving gear 82 and the follower gear 85 acts to move the driving gear 82 toward the distal end of the driving shaft 76.

Referring to FIG. 13, as the driving gear 82 moves in the circumferential direction about the driving shaft 76, the positional relationship in the circumferential direction between the head 765a of the second D-cut portion 765 of the driving shaft 76 and the opening 826 of the driving gear 82 changes. In such a state, if the thrust acts to move the driving gear 82 toward the distal end of the driving shaft 76, the contact walls 827 at the opening 826 of the driving gear 82 come into contact with the head 765a of the second D-cut portion 765.

According to the present exemplary embodiment, the driving gear 82 only needs to have a stopping portion in the gear body 821 thereof.

While the above exemplary embodiment relates to an image forming apparatus that forms a full-color image, the image forming apparatus may be a monochrome image forming apparatus.

While the above exemplary embodiment relates to a gear included in a driving device for driving a supplying auger and so forth included in a developing device, the gear is not limited thereto and may also be used for driving any other members of the developing device or for driving any image forming component other than the developing device.

While the above exemplary embodiment relates to an electrophotographic image forming apparatus, the image forming apparatus is not limited thereto and may be, for example, an inkjet image forming apparatus in which a component comes into contact with a sheet carrying an undried image composed of ink (an unfixed ink image) and thus fixes the ink image on the sheet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A gear comprising:
a gear body configured to be attached to a distal end of a driving shaft in an axial direction of the driving shaft and including teeth each extending obliquely with respect to the axial direction, wherein the driving shaft includes a D-cut portion at the distal end, and a round columnar portion adjacent to and on a proximal side with respect to a head of the D-cut portion, the round columnar portion having an outside diameter that is equal to or smaller than an outside diameter of the D-cut portion; and
a stopping portion included in the gear body and configured to allow the driving shaft to which the gear body is attached to move in a circumferential direction, wherein
when the driving shaft moves in the circumferential direction, the stopping portion is configured to stop the gear body from moving in the axial direction, the stopping portion stopping the gear body by coming into contact with a portion of the driving shaft,
the stopping portion has a through-hole into which the driving shaft is insertable, and
the stopping portion is configured to come into contact with the D-cut portion while allowing the driving shaft to move in the circumferential direction at the through-hole.

2. The gear according to claim 1,
wherein the D-cut portion is a double D-cut portion at the distal end of the driving shaft and having two D-cut facets, the D-cut facets extending parallel to a center axis of the driving shaft and being positioned opposite each other.

3. A driving device comprising:
a driving shaft configured to be rotated by a drive source; and
the gear according to claim 2 attached to an axial end of the driving shaft.

4. An image forming apparatus comprising:
an image forming component that forms an image; and
the driving device according to claim 3 drives the image forming component.

5. The gear according to claim 1,
wherein the stopping portion has a through-hole into which the driving shaft is insertable, and an opening at a distal end of the through-hole in a direction of insertion of the driving shaft and through which a head of the driving shaft is allowed to pass.

6. The gear according to claim 5,
wherein a shape of the opening is identical to a shape of the head of the driving shaft.

7. A driving device comprising:
a driving shaft configured to be rotated by a drive source; and
the gear according to claim 6 attached to an axial end of the driving shaft.

8. A driving device comprising:
a driving shaft configured to be rotated by a drive source; and
the gear according to claim 5 attached to an axial end of the driving shaft.

9. A driving device comprising:
a driving shaft configured to be rotated by a drive source; and
the gear according to claim 1 attached to an axial end of the driving shaft.

10. An image forming apparatus comprising:
an image forming component that forms an image; and
the driving device according to claim 9 drives the image forming component.

11. A gear comprising:
a receiving portion configured to have a driving shaft inserted in an axial direction wherein the driving shaft includes a D-cut portion at the distal end, and a round columnar portion adjacent to and on a proximal side with respect to a head of the D-cut portion, the round columnar portion having an outside diameter that is equal to or smaller than an outside diameter of the D-cut portion;
a tooth portion having teeth each extending obliquely with respect to the driving shaft;
an allowing portion in the receiving portion and configured to allow the driving shaft inserted into the receiving portion to move in a circumferential direction; and
a stopping portion at a distal end of the allowing portion in the axial direction and configured to stop the gear from moving in the axial direction on the driving shaft, wherein the stopping portion is configured to come into contact with the D-cut portion while allowing the driving shaft to move in the circumferential direction at the allowing portion.

12. A driving device comprising:
a driving shaft configured to be rotated by a drive source; and
the gear according to claim 11 attached to an axial end of the driving shaft.

* * * * *